A. HERZBERG.

Umbrella-Frames, Runners, and Notches.

No. 5,234. Reissued Jan. 14, 1873.

WITNESSES { Harry Smith
Thomas McIlvain

Abraham Herzberg
By his Atty.
Thomas J. Ellis

UNITED STATES PATENT OFFICE.

ABRAM HERZBERG, OF PHILADELPHIA, PENNSYLVANIA, ASSIGNOR OF HALF INTEREST TO ISAAC HERZBERG.

IMPROVEMENT IN UMBRELLA FRAMES, RUNNERS, AND NOTCHES.

Specification forming part of Letters Patent No. 132,363, dated October 22, 1872; reissue No. 5,234, dated January 14, 1873.

*To all whom it may concern:*

Figure 2:
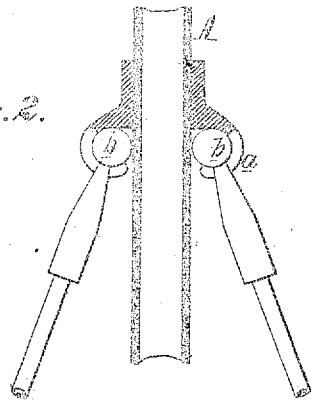
Figure 1:
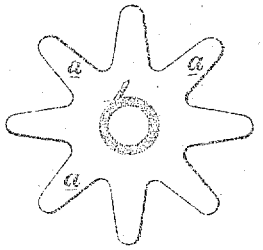
Figure 3:
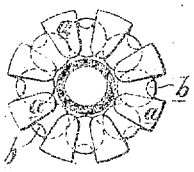

Be it known that I, ABRAM HERZBERG, of Philadelphia, county of Philadelphia, State of Pennsylvania, have invented an Improvement in Umbrella Frames, Runners, and Notches, of which the following is a specification:

The object of my invention is the simple and economical connection of the ribs of umbrellas to the notches or crown-pieces, and of the stretchers to the runners; and this object I attain by forming on the notch or runner as many radial projections *a* (shown in the plan view, Figure 1) as the umbrella has ribs, and bending these projections partly downward and partly around the ends *b* of the ribs, as shown in the vertical section, Fig. 2, so that each end, which may be spherical or enlarged, shall be confined to its place partly by two adjoining projections and partly by the stick A of the umbrella.

Ribs and stretchers having enlarged ends have heretofore been attached to notches and runners of umbrellas and parasols; but in all cases the said ends have been confined between two pieces, the preparation of which involved considerable expense, obviated by using one simple piece having radial projections, and by simply bending down the latter so as to confine the ends of the ribs or stretchers, which will move as freely as if they were connected by ordinary joints.

I claim as my invention—

1. An umbrella in which the enlarged ends of the ribs or stretchers are connected to the notches or runners by projections on the latter bent partly round the said enlarged ends, substantially as set forth.

2. An umbrella notch or runner, consisting of a tube having at one end bent radial projections, as specified.

In testimony whereof I have signed my name to this specification in the presence of two subscribing witnesses.

ABRAM HERZBERG.

Witnesses:
WM. A. STEEL,
HUBERT HOWSON.